United States Patent
Eiselt

(10) Patent No.: US 7,982,865 B2
(45) Date of Patent: Jul. 19, 2011

(54) METHOD AND DEVICE FOR MONITORING AN OPTICAL AMPLIFIER, IN PARTICULAR, AN OPTICAL FIBER AMPLIFIER

(75) Inventor: Michael Eiselt, Kirchheim (DE)

(73) Assignee: ADVA AG Optical Networking, Meiningen (DE)

( * ) Notice: Subject to any disclaimer, the term of this patent is extended or adjusted under 35 U.S.C. 154(b) by 511 days.

(21) Appl. No.: 12/107,640

(22) Filed: Apr. 22, 2008

(65) Prior Publication Data

US 2008/0285016 A1    Nov. 20, 2008

(30) Foreign Application Priority Data

Apr. 23, 2007   (DE) .......................... 10 2007 019 345

(51) Int. Cl.
   *G01N 21/00*    (2006.01)
(52) U.S. Cl. ........................................ 356/73.1; 398/37
(58) Field of Classification Search ................. 356/73.1; 398/37, 160
See application file for complete search history.

(56) References Cited

U.S. PATENT DOCUMENTS

2005/0128467 A1* 6/2005 Komaki ....................... 356/73.1

FOREIGN PATENT DOCUMENTS

EP          1 349 299 B1    10/2006

* cited by examiner

*Primary Examiner* — Tarifur R Chowdhury
*Assistant Examiner* — Tara S Pajoohi
(74) *Attorney, Agent, or Firm* — The Culbertson Group, P.C.

(57) ABSTRACT

The invention relates to a method for monitoring an optical amplifier, in particular, an optical fiber amplifier which has an optical input port and an optical output port. The optical pumping power of the amplifier is presumed to be directly proportional to the electrical pumping current, with a proportionality constant that decreases over time due to degradation. The functional dependence of the optical pumping power on the optical input signal power or the optical output signal power is determined at least for the predetermined nominal value of the optical gain. These relationships may be combined with certain measured values to determine the instantaneous optical pumping power, the instantaneous proportionality constant, and the maximum values for the optical input and output signal powers. These calculated parameters may be used to ensure that an increase of input power will not reduce the optical gain.

15 Claims, 2 Drawing Sheets

METHOD AND DEVICE FOR MONITORING AN OPTICAL AMPLIFIER, IN PARTICULAR, AN OPTICAL FIBER AMPLIFIER

TECHNICAL FIELD OF THE INVENTION

The invention relates to methods for monitoring an optical amplifier in which the optical signal power gain is controlled to a predetermined nominal value. The invention further relates to devices for performing these methods.

BACKGROUND OF THE INVENTION

Optical amplifiers such as fiber amplifiers using an erbium-doped fiber (known as erbium-doped fiber amplifiers (EDFA)) are used in optical transmission systems in order to amplify an optical payload signal that has been so severely attenuated after passing through a correspondingly long transmission path that an amplification of the signal is necessary. The direct amplification of the optical signal can be performed in an optical amplifier without the necessity of first performing an optoelectrical conversion and then an electrooptical conversion of the signal after signal amplification, as is the case for electrical amplification of the optical signal. The pumping power required in an optical amplifier is usually generated by means of a pump source having a laser diode, wherein the center wavelength of this pumping laser diode lies, for instance, in the range of 980 nm or in the range of 1480 nm. The pumping power is coupled by means of a coupler into the transmission path between the input port and the output port of the optical amplifier in the direction towards the optical amplification medium, for instance, an erbium-doped pumping fiber. The pumping power is absorbed by the erbium atoms; the optical signal to be amplified, which likewise passes through the pumping fiber, excites the erbium atoms, which have been excited to an elevated energy level, to produce a stimulated emission. The light generated in this manner thus has substantially the same frequency and the same phase as the optical payload signal to be amplified, which is thereby amplified in a purely optical manner. The optical gain G, which is defined as the ratio of the power of the amplified optical signal $P_{out}$ available at the output port divided by the optical power $P_{in}$ supplied to the input port, displays among other things a dependency on the degree of erbium doping and on the optical pumping power. The higher the pumping power $P_{pump}$, the greater is the optical gain G.

It must be taken into account, however, that in order to amplify an optical input signal $P_{in}$ of high power, a larger pumping power is also necessary in order to obtain the same gain G. The pumping power $P_{pump}$ generated by the pumping laser diode is directly proportional, to a good approximation, to the electrical pumping current $I_{pump}$ flowing through the pumping laser diode, i.e.:

$$P_{pump} = \alpha \cdot I_{pump}$$

where $\alpha$ designates the proportionality constant. It must naturally be taken into account that this relationship does not apply to very small pumping currents. For the range of optical pumping power $P_{pump}$ that is of interest, however, this relation represents a good approximation.

Since a part of the electrical power supplied to the pumping laser diode is converted into thermal loss power, the pumping current is limited to a maximum value $I_{pump,max}$. If this threshold for the pumping current is exceeded, the pumping laser diode is destroyed. Thus, the maximum possible optical pumping power is also limited to a maximum value $P_{pump,max}$.

In an optical amplifier, the pumping power $P_{pump}$ is typically regulated as a function of the power of the optical signal $P_{in}$ to be amplified and of the power of the optical output signal such that a predetermined value for the gain G is obtained. If the input optical signal power $P_{in}$ supplied to the input port of the amplifier is increased, for example because additional optical channels are added to an optical wavelength division multiplex transmission system, then the required optical pumping power $P_{pump}$ and thus the pumping current $I_{pump}$ must also be raised in order to keep the optical gain G at the desired value.

It must be taken into account in this regard that the pumping laser in particular is subject to aging effects, which are summarized under the term degradation. In other words, the pumping current $I_{pump}$ must be increased with increasing aging of a pumping laser diode in order to keep the optical pumping power $P_{pump}$ at a constant value. This circumstance is taken into account in the aforementioned proportionality relationship by introducing a time variance of the proportionality constant $\alpha(t)$. This situation is evident from the schematic representation in FIG. 2. This representation shows the aging effect of a pumping laser diode, which has the steepest correlation between the parameters $I_{pump}$ and $P_{pump}$ at a time $t_0$, and the corresponding correlation between these parameters at a later time $t_2$ has the lowest slope. In other words, $\alpha(t)$ decreases over time.

If the degradation of the pumping laser diode increases over time to such an extent that the pumping current has reached the maximum value $I_{pump,max}$ and can no longer be increased, in order to avoid a destruction of the pumping laser diode, then the gain G of the amplifier is reduced, whereby the performance of the optical transmission system in question is worsened. With typical well-known optical amplifiers for optical transmission paths, an alarm signal is therefore generated when the maximum value $I_{pump,max}$ for the pumping current, or a slightly lower value that guarantees a certain margin of safety, has been reached. For optical transmission systems in which an optical amplifier is initially operated well below the maximum permissible pumping current $I_{pump,max}$, no alarm is issued, even if the pumping laser diode has already aged considerably, but a pumping current $I_{pump} < I_{pump,max}$ still suffices to achieve the predetermined gain G.

However, if the optical transmission system and the optical amplifier were designed from the start for the amplification of larger input powers at the input of the optical amplifier, then it can occur that after a certain aging time, the maximum possible pumping power $P_{pump,max}$ of the pumping laser diode is no longer sufficient to maintain the predetermined value G of the gain within the original specification if there is an increase of the optical input power $P_{in}$ supplied to the amplifier. This can occur, for instance, in a wavelength division multiplex transmission system if additional channels are added after a certain aging time. Since the maximum possible pumping power $P_{pump,max}$ no longer suffices, even the originally present channels are impaired. This is not acceptable, however.

SUMMARY OF THE INVENTION

The present invention includes methods for assuring that an intended increase of the input power supplied to the amplifier does not lead to a reduction of the value for the optical gain G. The present invention also includes devices for performing these methods.

The invention starts from the recognition that the connection between the pumping power $P_{pump}$ that is necessary for the amplification of an input signal with input signal power $P_{in}$ with a predetermined gain G is not subject to any substantial degradation and therefore need be determined only one time for the optical amplifier in question (or also for a given type of an optical amplifier if a sufficiently small scattering of the characteristics of the individual components can be guaranteed), and can be stored, for instance. Instead of or in addition to the parameter $P_{in}$, it is of course possible for the output signal power $P_{out}$ to be included in this correlation, since the two parameters are directly connected via the gain G.

Thus, for a given (current) input signal power $P_{in,1}$ and/or a given (current) output signal power $P_{out,1}$, the required pumping power $P_{pump,1}$ can be ascertained from this correlation that is determined only once.

Under the assumption of a direct proportionality between the optical pumping power $P_{pump}$ and the electric pumping current $I_{pump}$, the time-variant proportionality constant $\alpha(t_1)$ effective at the respective time $t_1$ can then be determined from these two parameters. The instantaneous pumping current $I_{pump,1}$ can also be detected in an ordinary manner by direct or indirect measurement or can be supplied as an analog or digital value by the drive unit of the pumping source.

Using the thus-determined value for the currently valid proportionality constant $\alpha(t_1)$, it is then possible, with the likewise known, maximally permissible value $I_{pump,max}$, to calculate the maximum possible pumping power $P_{pump,max}$. Using the known connection between the pumping power $P_{pump}$ and the optical input signal power $P_{in}$, or the optical output signal power $P_{out}$, the associated maximum value for the optical input signal power $P_{in,max}$, or the maximum value for the optical output signal power $P_{out,max}$, can be determined by means of the value for the maximum pumping power $P_{pump,max}$ determined in the manner above. If the connection between the pumping power and the optical input signal power or the optical output signal power is known only as a functional dependency in one direction, then an inversion of the respective dependence may be necessary for this purpose.

It can thus be determined for an intended application of a desired optical power $P_{in}$ to the input port of the amplifier whether, under the assumption that a predetermined value for the gain G is to be maintained, the pumping source of the amplifier is capable of supplying the necessary pumping power. If this is not possible, then an error signal can be generated in advance.

This method can of course also be applied in such a manner that the maximum possible input signal power $P_{in,max}$ is determined at predetermined time intervals or at predetermined times. If this value has decreased as a result of degradation to a minimum permissible value as set forth, for example, in a specification for the amplifier or the respective transmission path, then an error signal can be generated indicating that the amplifier or the transmission path no longer meets the specification, or that the amplifier or the transmission path may only be operated with lower optical powers than were originally established in the specification, or with a lower gain G if conditions permit.

According to one configuration of the invention, the functional dependence of the pumping power $P_{pump}$ on the optical input signal power $P_{in}$ and/or the optical output signal power $P_{out}$ can additionally be determined as a function of the gain G, and stored if desired.

This makes it possible to perform the method in such a manner that, instead of a fixed value for the gain G, a maximum possible value of the gain G is determined, using the previously determined maximum possible value for the pumping power $P_{pump,max}$ and the desired value for the input signal power $P_{in}$, or the desired value for the optical output signal power $P_{out}$, for this purpose.

The functional dependence of the pumping power on the input or output power and, if desired, on the gain, can of course be determined empirically for the specific amplifier or, as explained above, as an example for a given type of amplifier, the latter being possible or meaningful only if components of sufficiently similar characteristics are available.

The functional dependence of the pumping power on the above-mentioned parameters can of course be determined in the form of a value field or as a functional dependency and can optionally be stored.

If a direct proportionality in the form $P_{pump} = \beta(G) \cdot P_{in}$ is used as an approximation for the dependence of pumping power $P_{pump}$ on the optical signal input power $P_{in}$, where $\beta(G)$ is a proportionality constant dependent on the gain G, then, using the proportionality $P_{pump} = \alpha \cdot I_{pump}$, the maximum permissible value for the optical input signal power can be determined according to the relation $P_{in,max} = P_{in,1} \cdot I_{pump,max} / I_{pump,1}$, where the parameters with the index 1 are the respective corresponding parameters detected at the current time $t_1$.

In this way it is possible to specify a simple analytical relationship with the maximum possible input power $P_{in,max}$ at a desired value of the gain G, whereby the former can be calculated without using numerical methods.

In place of the input signal power $P_{in}$, it is of course also possible to use the optical output signal power $P_{out}$, which results by multiplying the optical input power $P_{in}$ and the gain G.

This method for monitoring an optical amplifier can of course also be used in the design and/or in an upgrade of an optical transmission path that contains at least one such optical amplifier.

Before increasing the optical power supplied to the transmission path at the input, the above-described method can first be used to determine the maximum input power at the input port of the amplifier that can be amplified by the amplifier (for a given gain G). Then the optical transmission path may be supplied at most an optical signal power that leads at the input and output of the amplifier to the maximum values for the input signal power $P_{in,max}$ and for the output signal power $P_{out,max}$ respectively, determined as a described above, taking into account the predetermined value for the gain G.

If the transmission path is a wavelength division multiplex transmission path, then, by determining the maximum permissible values for the input and output signal power $P_{in,max}$ and $P_{out,max}$, respectively, the maximum number of possible optical channels can be determined if their individual optical signal powers are added up.

In an upgrade of an existing wavelength division multiplex transmission path, a possible degradation that may have occurred in the meantime can be taken into account by the above-described method. The maximum possible value of the input signal power or the output signal power $P_{in,max}$ or $P_{out,max}$, respectively, is determined at the respective current point in time. The difference between the currently transmitted input or output signal power $P_{in,1}$ or $P_{out,1}$, respectively, and the respective possible maximum values $P_{in,max}$ and $P_{out,max}$ can then be ascertained as the power reserve $\Delta P_{in}$ or $\Delta P_{out}$, respectively. This power reserve must be greater than the additional power (at the input port or output port of the amplifier) that is to be transmitted for the channels that are to be added. It can naturally also be required that a given power reserve must remain as a security in order to compensate for future degradation of the amplifier.

The power to be transmitted via the optical transmission path can also be increased step-by-step starting from a current value for the transmitted optical power, until the maximum permissible input or output signal power $P_{in,max}$ or $P_{out,max}$ at the input or output port, respectively, of the amplifier has been reached. In the case of a wavelength division multiplex transmission path, additional channels can be added individually or in predetermined groups of 2, 3 or more channels. After each step the power reserve still remaining can be determined.

If the addition of a given number of optical channels to an existing wavelength division multiplex transmission system is planned and the currently determined power reserve is not sufficient, then the process of connecting the channels can either be completely prevented, or the number of channels to be added can be restricted such that the overall optical power to be added at the input port or the output port of the amplifier is less than the power reserve that is available.

This method can of course also be used for the case where several pumping sources are contained in one optical amplifier. Then the proportionality constant α applicable at any given point in time can be determined for each pumping source. From this the maximum "reserve" of the optical pumping power or the maximum optical pumping power can be determined in an analogous manner for each pumping source.

A device embodying the principles of the invention for monitoring an optical amplifier includes, in addition to the objective characteristics of an ordinary optical amplifier, an evaluation and control unit that performs the above-described method, preferably using suitable software. The device can either be integrated into the amplifier itself or can be constructed as part of a higher-level device, for instance, a device for monitoring an optical transmission path or a management unit for managing a transmission path or a data transfer network. The device can of course also contain several pumping sources instead of a single pumping source, in which case the power of one or more pumping sources can be coupled into the optical path either in or against the signal transmission direction.

These and other advantages and features of the invention will be apparent from the following description of the illustrative embodiments, considered along with the accompanying drawings.

BRIEF DESCRIPTION OF THE DRAWINGS

The invention will be described in detail below with reference to figures of the drawing. In the drawing.

DESCRIPTION OF ILLUSTRATIVE EMBODIMENTS

Figure 1:
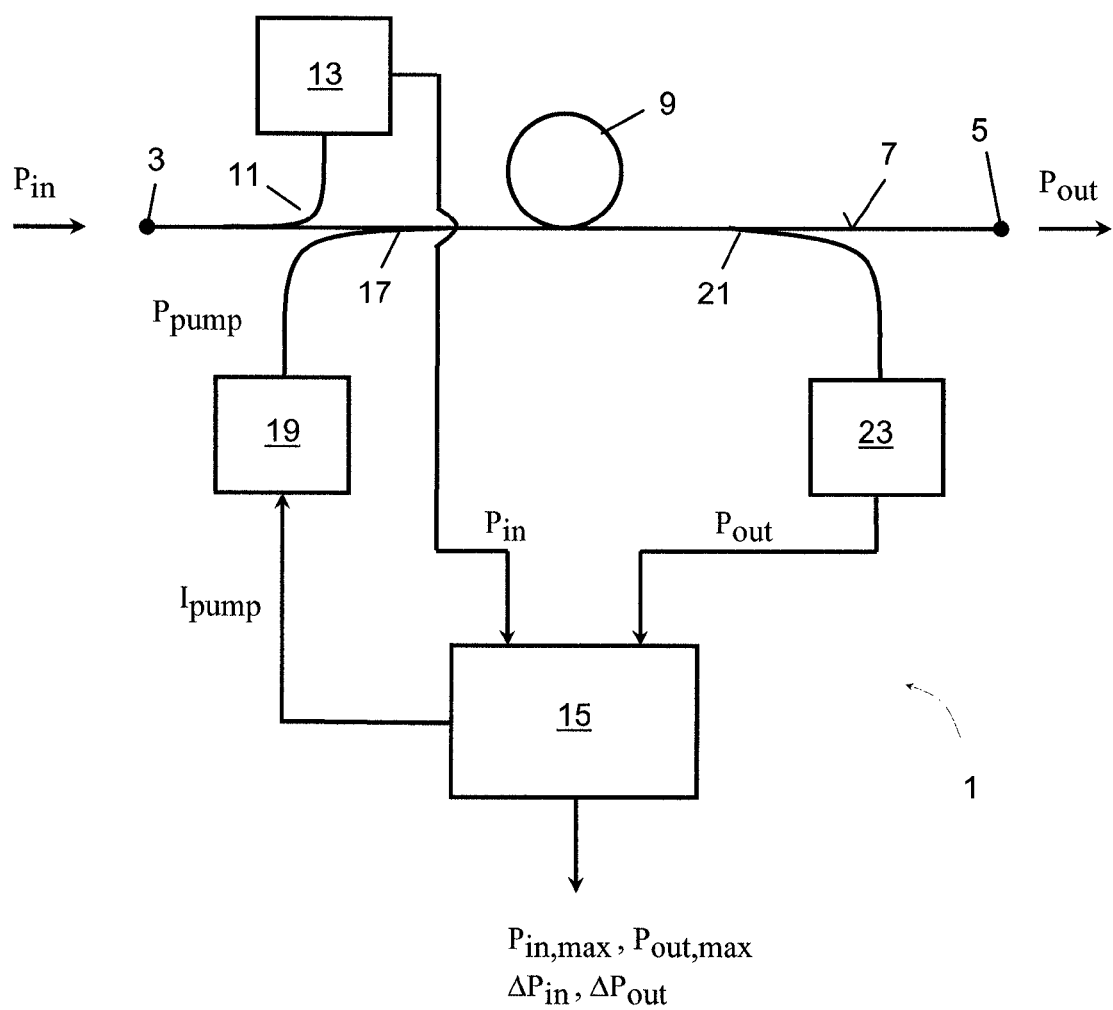
FIG. 1 is a schematic block diagram of an optical fiber amplifier adapted for performing methods according to the present invention.

The fiber amplifier 1 shown in FIG. 1 has an input port 3 and output port 5, which are connected via an optical path 7. An optically active medium in the form of an amplification fiber 9, which can be embodied as an erbium-doped fiber, for example, is provided in optical path 7.

The optical input signal power $P_{in}$ supplied to fiber amplifier 1 at input port 3 is detected by means of a coupler 11 and a detector unit 13. Coupler 11 diverts only a small part of the optical input signal power $P_{in}$ away from optical path 7, and supplies this partial power to detector unit 13. Since the ratio $k_1$ of how much of the input signal power $P_{in}$ of coupler 11 is diverted out of path 7 is fixed and known, detector unit 13 can correctly ascertain the value for the optical input power $P_{in}$ and supply it to an evaluation and control unit 15.

Downstream of coupler 11 in the direction of signal transmission, an additional coupler 17 is provided in path 7, which couples the pumping power $P_{pump}$ emitted at the output of an optical pumping source 19 into optical path 7 in the direction towards optical amplification medium 9. An amplification of the input signal with the input signal power $P_{in}$ supplied to input port 3 of fiber amplifier 1 occurs by known mechanisms inside optical amplification medium 9. Part of the amplified output signal is coupled out by means of an additional coupler 21 arranged upstream of output port 5 in optical path 7 and is applied to an additional detector unit 23. Since the diversion ratio of coupler 21 is again fixed and known, detector unit 23 can ascertain the optical output power $P_{out}$ of the optical signal emitted at output port 5. This value is likewise supplied to evaluation and control unit 15.

Evaluation and control unit 15 preferably controls pumping source 19 such that a predetermined value for the gain G is maintained, the gain G being defined as the ratio of the optical output signal power $P_{out}$ and the optical input signal power $P_{in}$.

Evaluation and control unit 15 is additionally aware of the relationship between the pumping power $P_{pump}$ and the input signal power $P_{in}$ to be amplified for the respective given value of gain G. This relationship can be stored, for example, as a functional dependency $P_{pump}=f(G, P_{in})$. Storage can be done in the form of a value field or in an analytical form.

Since the optical pumping power $P_{pump}$ is approximately directly proportional to the pumping current $I_{pump}$, which is specified to pumping source 19 by evaluation and control unit 15, the proportionality constant $\alpha(t_1)$ subject to degradation at the current time $t_1$ can be ascertained from the direct proportionality $P_{pump}=\alpha \cdot I_{pump}$, where α indicates the proportionality constant, and the above-described connection between the pumping power $P_{pump}$ and the gain G or the input signal power $P_{in}$. For this purpose evaluation and control unit 15 uses a currently detected value for the optical input signal power $P_{in,1}$ and the desired or predetermined value for the gain G and, from them it determines, with the relationship known to it, the pumping power $P_{pump,1}$ that is necessary to amplify the input signal power $P_{in,1}$ with a gain of G.

If this pumping power $P_{pump,1}$ has been determined, then evaluation and control unit 15 can determine the currently valid proportionality constant $\alpha(t_1)=P_{pump,1}/I_{pump,1}$ from the above-mentioned proportionality relationship between the pumping power and the pumping current rate.

Additionally, evaluation and control unit 15 is aware of the value for the maximum possible pumping current $I_{pump,max}$, which it can adjust at pumping source 19 in order not to destroy the electro-optical converter element of pumping source 19, such as a laser diode. Using the value for the maximum pumping current $I_{pump,max}$ and the previously determined proportionality constant $\alpha(t_1)$, the value for the maximum possible optical pumping power $P_{pump,max}$ can then be calculated as $P_{pump,max}=\alpha(t_1) \cdot I_{pump,max}$, again using the proportionality relationship.

With this value for the maximum optical pumping power $P_{pump,max}$, the maximum value for the input signal power $P_{in}$ can be determined using the previously explained relationship $P_{pump}=f(G, P_{in})$ for the given gain G. The above-described functional dependency must of course be inverted for this purpose. If this relationship is stored as a value field, then this can be done by interpolation between adjacent values.

Thus evaluation and controlling unit 15 can determine in this manner how large the maximum optical input power $P_{in}$ supplied at the input port 3 of fiber amplifier 1 can be in order to be able to still amplify it with the predetermined gain G without pumping source 19 having to be driven into an impermissible range. Since ordinary control units limit the value for the pumping current $I_{pump}$ to the maximum value $I_{pump,max}$, the gain G would fall below the desired predetermined value in case of an excessively high optical input signal power $P_{in} > P_{in,max}$, i.e., the optical output signal power $P_{out}$ would be smaller than the desired value. This would lead to an impairment of the transmission path.

Evaluation and control unit 15 can supply the ascertained value for the maximum input signal power $P_{in,max}$ or the reserve $\Delta P_{in} = P_{in,max} - P_{in,1}$ to a higher-level unit that decides, using these ascertained parameters, whether and, if appropriate, to what extent the input power $P_{in}$ can be increased from the current value.

If the linearizing approximation $P_{pump} = \beta(G) \cdot P_{in}$ is used instead of the general functional dependency $P_{pump} = f(G, P_{in})$, then using the direct proportionality between the pumping power $P_{pump}$ and pumping current $I_{pump}$, it follows that $$P_{in,max} = P_{in,1} \frac{I_{pump,max}}{I_{pump,1}}$$

Optical input power $P_{in,1}$ and pumping current $I_{pump,1}$ in this relationship are values that are detected at the respective current point in time and thus take into account a possible already existing degradation of the pumping source (with respect to the time $t_0$ that represents, for instance, the time of installation of the optical amplifier).

Figure 2:
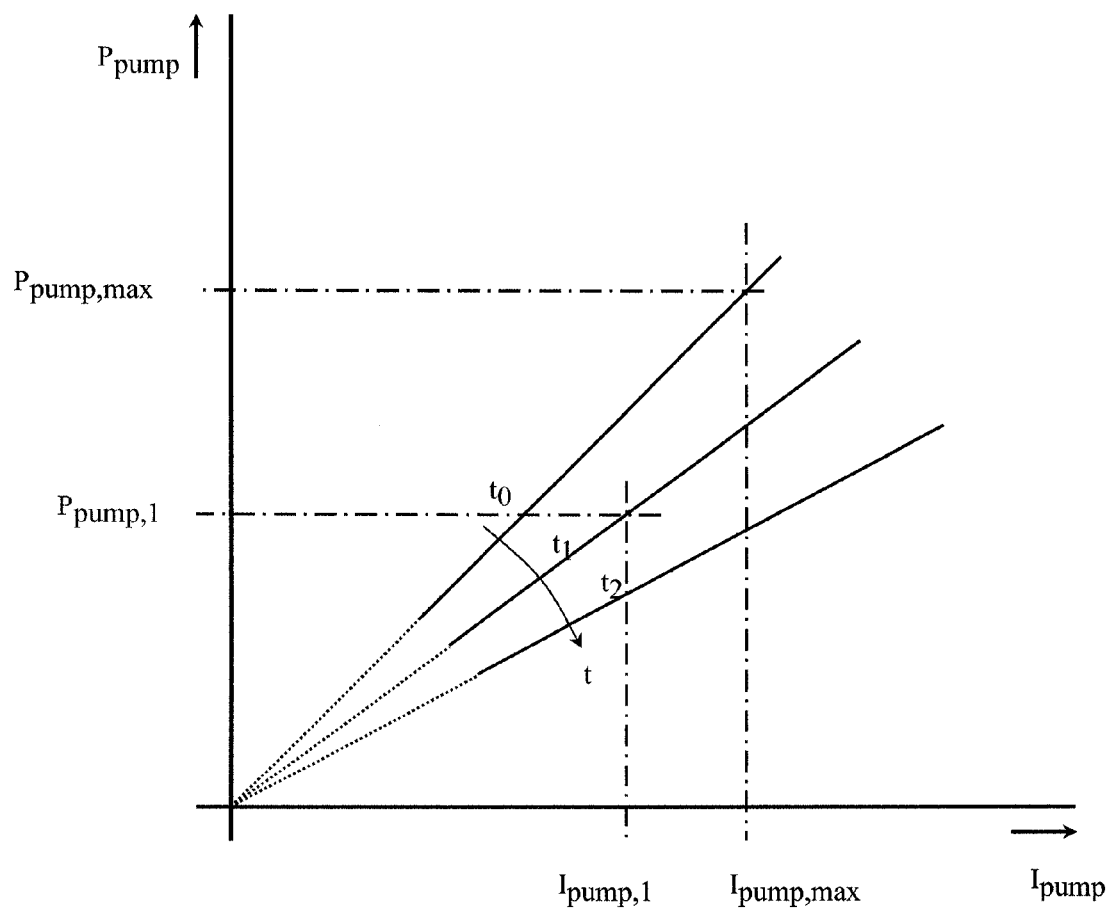
FIG. 2 is a diagram showing the dependence of the optical pumping power $P_{pump}$ on the pumping current $I_{pump}$ in the case of a degradation of the pumping source over time.

As already mentioned above, the degradation of pump source 19, as is evident from FIG. 2, leads over time (the relationships for times $t_0$, $t_1$, $t_2$ are illustrated here) to a reduction of the slope of the straight lines that represent the connection between the pumping power $P_{pump}$ and the pumping current $I_{pump}$. FIG. 2 also shows for the sake of example a point on the line for time $t_1$ with the pumping current $I_{pump,1}$ and the corresponding pumping power $P_{pump,1}$.

If the higher-level evaluation and control unit (not shown) is a unit for controlling a transmission path or a management unit for an entire transmission network, then such an evaluation and control unit can query the currently available maximum power reserve or the maximum possible input signal power from all optical amplifiers present in the transmission path. The optical input power at the beginning of the optical transmission path in question is then set by this evaluation and control unit such that the available power reserve or the maximum possible input signal power is not exceeded for any of the optical amplifiers.

If the transmission path is a wavelength division multiplex transmission path, then a performance increase by connecting additional channels may be necessary. By using the above explained method, it can then be checked before the connection of the additional channels whether an impairment of the currently transmitting channels will result because the maximum possible input signal power was exceeded at one of the optical amplifiers.

It can also be decided that either the addition of all channels will be abandoned or that merely a number of channels will be added that do not cause an exceeding of the maximum possible input signal power or an exceeding of the respective power reserve for any of the optical amplifiers.

It may be noted in closing that at every point where the input signal power $P_{in}$ was used, this parameter could be replaced by the output signal power $P_{out}$, since these two parameters are connected by way of the gain G.

As used herein, whether in the above description or the following claims, the terms "comprising," "including," "carrying," "having," "containing," "involving," and the like are to be understood to be open-ended, that is, to mean including but not limited to. Also, any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described illustrative embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for monitoring an optical amplifier having an optical path extending between an optical input port and an optical output port with an optical amplification element located within the optical path, and further having a pumping source which applies an optical pumping power ($P_{pump}$) to the optical path via a coupling unit connected within the optical path, the optical input port receiving an optical signal at an optical input signal power ($P_{in}$) and the optical output port emitting an optical signal at an optical output signal power ($P_{out}$) with a gain (G) controlled to a predetermined nominal value, the method including:
   (a) determining the functional dependence of the optical pumping power ($P_{pump}$) on the optical input signal power ($P_{in}$) or the optical output signal power ($P_{out}$) for the predetermined nominal value of the gain (G);
   (b) determining a current optical pumping power value ($P_{pump,1}$) by the functional dependence determined at step (a) and a currently detected optical input signal power value ($P_{in,1}$) or a currently detected optical output signal power value ($P_{out,1}$);
   (c) determining a currently valid value for a proportionality constant $\alpha(t_1)$ with the current optical pumping power value ($P_{pump,1}$) determined at step (b) and a currently detected first electrical pumping current value ($I_{pump,1}$), wherein the proportionality relationship $P_{pump} = \alpha(t) \cdot I_{pump}$ is presumed where $P_{pump}$ is the optical pumping power value, $I_{pump}$ is the electrical pumping current value, and $\alpha(t)$ is a time-variant proportionality constant that is subject to a degradation over time;
   (d) determining a maximum possible pumping power value ($P_{pump,max}$) from a maximum permissible electrical pumping current value ($I_{pump,max}$) and from the currently valid value $\alpha(t_1)$ by means of the proportionality relationship; and
   (e) determining a maximum optical input signal power value ($P_{in,max}$) from the maximum possible pumping power value ($P_{pump,max}$) and from the inverse functional dependence of the optical pumping power on the optical input signal power as determined in step (a), where the optical input signal power is expressed directly or in terms of the ratio of the optical output signal power to the gain (G), or determining the maximum optical output signal power value ($P_{out,max}$) from the maximum possible pumping power value ($P_{pump,max}$) and from the inverse functional dependence of the optical pumping power on the optical output signal power as determined in step (a), where the optical output signal power is expressed directly or in terms of the product of the optical input signal power and the gain (G).

2. The method of claim 1 wherein the functional dependence of the optical pumping power ($P_{pump}$) is also determined as a function of the gain (G).

3. The method of claim 1 wherein the functional dependency of the optical pumping power ($P_{pump}$) is determined empirically for the optical amplifier.

4. The method of claim 1 wherein the functional dependence of the optical pumping power ($P_{pump}$) is determined and stored as a value field.

5. The method of claim 1 wherein the functional dependence of the optical pumping power ($P_{pump}$) is determined as an analytical function.

6. The method of claim 1 further including supplying the optical path only with an optical signal power that leads to a value for an optical input signal power value ($P_{in}$) at the input port that is less than or equal to the maximum optical input signal power value ($P_{in,max}$), or that leads to a value for an optical output signal power value ($P_{out}$) at the output port that is less than or equal to the maximum optical output signal power value ($P_{out,max}$).

7. A method for designing or upgrading an optical transmission path having at least one optical amplifier which has an optical path extending between an optical input port and an optical output port with an optical amplification element located within the optical path, and which further has a pumping source which applies an optical pumping power ($P_{pump}$) to the optical path via a coupling unit connected within the optical path, the optical input port receiving an optical signal at an optical input signal power ($P_{in}$) and the optical output port emitting an optical signal at an optical output signal power ($P_{out}$) with a gain (G) controlled to a predetermined nominal value, and wherein the input port and the output port of the at least one optical amplifier are connected to the transmission path by an optical transmission medium, the method including:

(a) determining the functional dependence of the optical pumping power ($P_{pump}$) on the optical input signal power ($P_{in}$) or the optical output signal power ($P_{out}$) for the predetermined nominal value of the gain (G);

(b) determining a current optical pumping power value ($P_{pump,1}$) by the functional dependence determined at step (a) and a currently detected optical input signal power value ($P_{in,1}$) or a currently detected optical output signal power value ($P_{out,1}$);

(c) determining a currently valid value for a proportionality constant $\alpha(t_1)$ with the current optical pumping power value ($P_{pump,1}$) determined at step (b) and a currently detected first electrical pumping current value ($I_{pump,1}$), wherein the proportionality relationship $P_{pump}=\alpha(t)\cdot I_{pump}$ is presumed where $P_{pump}$ is the optical pumping power value, $I_{pump}$ is the electrical pumping current value, and $\alpha(t)$ is a time-variant proportionality constant that is subject to a degradation over time;

(d) determining a maximum possible pumping power value ($P_{pump,max}$) from a maximum permissible electrical pumping current value ($I_{pump,max}$) and from the currently valid value $\alpha(t_1)$ by means of the proportionality relationship;

(e) determining a maximum optical input signal power value ($P_{in,max}$) from the maximum possible pumping power value ($P_{pump,max}$) and from the inverse functional dependence of the optical pumping power on the optical input signal power as determined in step (a), where the optical input signal power is expressed directly or in terms of the ratio of the optical output signal power to the gain (G), or determining the maximum optical output signal power value ($P_{out,max}$) from the maximum possible pumping power value ($P_{pump,max}$) and from the inverse functional dependence of the optical pumping power on the optical output signal power as determined in step (a), where the optical output signal power is expressed directly or in terms of the product of the optical input signal power and the gain (G); and (f) supplying the optical transmission path only with an optical signal power that leads to a value for an optical input signal power value ($P_{in}$) at the input port that is less than or equal to the maximum optical input signal power value ($P_{in,max}$), or that leads to a value for an optical output signal power value ($P_{out}$) at the output port that is less than or equal to the maximum optical output signal power value ($P_{out,max}$).

8. The method of claim 7 wherein the optical transmission path is a wavelength division multiplex transmission path and wherein when one or more optical channels are to be added to a wavelength division multiplex signal to be transmitted, a power reserve value is first determined for either the optical input signal power ($P_{in}$) or the optical output signal power ($P_{out}$), the power reserve value for the optical input signal power ($P_{in}$) being defined by the difference between the maximum permissible optical input signal power value ($P_{in,max}$) and the currently detected optical input signal power value ($P_{in,1}$), and the power reserve value for the optical output signal power ($P_{out}$) being defined by the difference between the maximum permissible optical output signal power value ($P_{out,max}$) and the currently detected optical output signal power value ($P_{out,1}$).

9. The method of claim 8 wherein the one or more additional channels to be added are added only if the power that is generated at the input port or the output port of the at least one optical amplifier by the one or more channels to be added is less than the respective power reserve value for the optical input signal power ($P_{in}$) or the power reserve value for the optical output signal power ($P_{out}$).

10. The method of claim 8 wherein only a number of channels are added that generate an optical power at the input port that is less than the power reserve value for the optical input signal power ($P_{in}$) or that generate an optical power at the output port that is less than the power reserve value for the optical output signal power ($P_{out}$).

11. A device for monitoring an optical amplifier having an optical path extending between an optical input port and an optical output port with an optical amplification element located within the optical path, and further having a pumping source which applies an optical pumping power ($P_{pump}$) to the optical path via a coupling unit connected within the optical path, the optical input port receiving an optical signal at an optical input signal power ($P_{in}$) and the optical output port emitting an optical signal at an optical output signal power ($P_{out}$), the device including:

(a) optical input signal power detecting means for detecting the optical input signal power ($P_{in}$) supplied to the input port, or optical output signal power detecting means for detecting the optical output signal power ($P_{out}$) supplied to the output port;

(b) a pump control device for controlling the optical gain (G) of the optical amplifier to a predetermined nominal value; and (c) an evaluation and control unit connected to receive a value for the optical input signal power ($P_{in}$) detected by the optical input signal power detecting means, or connected to receive a value for the optical output signal power ($P_{out}$) detected by the optical output signal power detecting means, wherein the evaluation and control unit is configured to:
- (i) determine the functional dependence of the optical pumping power ($P_{pump}$) on the optical input signal power ($P_{in}$) or the optical output signal power ($P_{out}$) for the predetermined nominal value of the gain (G);
- (ii) determine a current optical pumping power value ($P_{pump,1}$) by the functional dependence determined at step (i) and a currently detected optical input signal power value ($P_{in,1}$) or a currently detected optical output signal power value ($P_{out,1}$);
- (iii) determine a currently valid value for a proportionality constant $\alpha(t_1)$ with the current optical pumping power value ($P_{pump,1}$) determined at step (ii) and a currently detected first electrical pumping current value ($I_{pump,1}$), wherein the proportionality relationship $P_{pump}=\alpha(t) \cdot I_{pump}$ is presumed where $P_{pump}$ is the optical pumping power value, $I_{pump}$ is the electrical pumping current value, and $\alpha(t)$ is a time-variant proportionality constant that is subject to a degradation over time;
- (iv) determine a maximum possible pumping power value ($P_{pump,max}$) from a maximum permissible pumping current value ($I_{pump,max}$) and from the currently valid value $\alpha(t_1)$ by means of the proportionality relationship; and
- (v) determine a maximum optical input signal power value ($P_{in,max}$) from the maximum possible pumping power value ($P_{pump,max}$) and from the inverse functional dependence of the optical pumping power on the optical input signal power as determined in step (a), where the optical input signal power is expressed directly or in terms of the ratio of the optical output signal power to the gain (G), or determine the maximum optical output signal power value ($P_{out,max}$) from the maximum possible pumping power value ($P_{pump,max}$) and from the inverse functional dependence of the optical pumping power on the optical output signal power as determined in step (a), where the optical output signal power is expressed directly or in terms of the product of the optical input signal power and the gain (G).

12. The device of claim 11 wherein the device transfers the maximum optical input signal power value ($P_{in,max}$), or the maximum optical output signal power value ($P_{out,max}$) or a power reserve value for the optical input signal power ($P_{in}$), or a power reserve value for the optical output signal power ($P_{out}$) to a second control unit, wherein the power reserve value for the optical input signal power ($P_{in}$) is defined by the difference between the maximum permissible optical input signal power value ($P_{in,max}$) and the currently detected optical input signal power value ($P_{in,1}$), and the power reserve value for the optical output signal power ($P_{out}$) is defined by the difference between the maximum permissible optical output signal power value ($P_{out,max}$) and the currently detected optical output signal power value ($P_{out,1}$).

13. A method for monitoring an optical amplifier having an optical path extending between an optical input port and an optical output port with an optical amplification element located within the optical path, and further having a pumping source which applies an optical pumping power ($P_{pump}$) to the optical path via a coupling unit connected within the optical path, the optical input port receiving an optical signal at an optical input signal power ($P_{in}$) and the optical output port emitting an optical signal at an optical output signal power ($P_{out}$) with a gain (G) controlled to a predetermined nominal value, the method including:
- (a) detecting a current value for the optical input signal power, or detecting a current value for the optical output signal power;
- (b) detecting a current value for the electrical pumping current;
- (c) determining a maximum permissible optical input signal power value ($P_{in,max}$) according to the relationship $P_{in,max}=P_{in,1} \cdot I_{pump,max}/I_{pump,1}$, where $P_{in,1}$ is the currently detected optical input signal power, $I_{pump,max}$ is the maximum permissible electrical pumping current value, and $I_{pump,1}$ is the currently detected electrical pumping current value, or determining a maximum permissible optical output signal power value ($P_{out,max}$) according to the relationship $P_{out,max}=P_{out,1} \cdot I_{pump,max}/I_{pump,1}$, where $P_{out,1}$ is the currently detected optical output signal power, $I_{pump,max}$ is the maximum permissible electrical pumping current value, and $I_{pump,1}$ is the currently detected electrical pumping current value; and
- (d) supplying the optical path only with an optical signal power that leads to a value for an optical input signal power value ($P_{in}$) at the input port that is less than or equal to the maximum optical input signal power value ($P_{in,max}$), or that leads to a value for an optical output signal power value ($P_{out}$) at the output port that is less than or equal to the maximum optical output signal power value ($P_{out,max}$).

14. A device for monitoring an optical amplifier having an optical path extending between an optical input port and an optical output port with an optical amplification element located within the optical path, and further having a pumping source which applies an optical pumping power ($P_{pump}$) to the optical path via a coupling unit connected within the optical path, the optical input port receiving an optical signal at an optical input signal power ($P_{in}$) and the optical output port emitting an optical signal at an optical output signal power ($P_{out}$), the device including:
- (a) optical input signal power detecting means for detecting the optical input signal power ($P_{in}$) supplied to the input port, or optical output signal power detecting means for detecting the optical output signal power ($P_{out}$) supplied to the output port;
- (b) a pump control device for controlling the optical gain (G) of the optical amplifier to a predetermined nominal value; and
- (c) an evaluation and control unit connected to receive a value for the optical input signal power ($P_{in}$) detected by the optical input signal power detecting means, or connected to receive a value for the optical output signal power ($P_{out}$) detected by the optical output signal power detecting means, wherein the evaluation and control unit is configured to:
  - (i) detect a current value for the electrical pumping current; and
  - (ii) determine a maximum permissible optical input signal power value ($P_{in,max}$) according to the relationship $P_{in,max}=P_{in,1} \cdot I_{pump,max}/I_{pump,1}$, where $P_{in,1}$ is the currently detected optical input signal power, $I_{pump,max}$ is the maximum permissible electrical pumping current value, and $I_{pump,1}$ is the currently detected electrical pumping current value, or determine a maximum permissible optical output signal power value ($P_{out,max}$) according to the relationship $P_{out,max}=P_{out,1} \cdot I_{pump,max}/I_{pump,1}$, where $P_{out,1}$ is the currently detected optical output signal power, $I_{pump,max}$ is the maximum permissible electrical pumping current value, and $I_{pump,1}$ is the currently detected electrical pumping current value.

15. The device of claim 14 wherein the device transfers the maximum optical input signal power value ($P_{in,max}$), or the maximum optical output signal power value ($P_{out,max}$) or a power reserve value for the optical input signal power ($P_{in}$), or a power reserve value for the optical output signal power ($P_{out}$) to a second control unit, wherein the power reserve value for the optical input signal power ($P_{in}$) is defined by the difference between the maximum permissible optical input signal power value ($P_{in,max}$) and the currently detected optical input signal power value ($P_{in,1}$), and the power reserve value for the optical output signal power ($P_{out}$) is defined by the difference between the maximum permissible optical output signal power value ($P_{out,max}$) and the currently detected optical output signal power value ($P_{out,1}$).

* * * * *